United States Patent [19]

Reich

[11] 4,090,899
[45] May 23, 1978

[54] THERMOPLASTICS WELDING METHOD

[75] Inventor: Fritz Reich, Uhwiesen, Switzerland

[73] Assignee: Georg Fischer A.G., Schaffhausen, Switzerland

[21] Appl. No.: 637,118

[22] Filed: Dec. 3, 1975

[30] Foreign Application Priority Data

Dec. 6, 1974 Switzerland .................. 16221/74

[51] Int. Cl.² .............................................. B29C 19/06
[52] U.S. Cl. ..................................... 156/79; 156/275;
156/294; 264/46.6; 285/292
[58] Field of Search ............................. 156/293-295,
156/304, 77-79, 272, 275, 83; 264/45.6, 46.5,
46.6, 46.9, 54; 285/41, 284, 286, 288, 292, 295,
423

[56] References Cited

U.S. PATENT DOCUMENTS

| | | | |
|---|---|---|---|
| 1,427,133 | 8/1922 | Taliaferro | 264/46.9 X |
| 3,451,696 | 6/1969 | Hagelin et al. | 156/79 X |
| 3,506,519 | 4/1970 | Blumenitranz | 156/275 |
| 3,788,928 | 1/1974 | Wise | 156/275 X |
| 3,818,085 | 6/1974 | Marsland et al. | 156/79 X |
| 3,874,067 | 4/1975 | Toyooka et al. | 156/304 X |
| 3,900,360 | 8/1975 | Leatherman | 156/309 X |
| 3,946,096 | 3/1976 | Gomort | 156/79 X |

*Primary Examiner*—David A. Simmons
*Attorney, Agent, or Firm*—Michael Klotz

[57] ABSTRACT

A welding method for joining self-supporting structures made of thermoplastics by assembling said structures to form an area of mutual overlap, generating heat in said area to produce a welding zone having an elevated temperature and containing said thermoplastics in an at least plastic state for mutual coalescence of said structures in said area; an expanding agent is provided in the welding zone to generate a gas pressure therein for promoting coalescence of the weld. The invention is particularly suitable for welding tubes and other pipeline elements, such as fittings or sleeves, of thermoplastics and produces a tumescent weld which fills any macroscopic voids while including a plurality of minute closed cell voids.

19 Claims, 8 Drawing Figures

THERMOPLASTICS WELDING METHOD

BACKGROUND OF THE INVENTION

The present invention relates to methods of joining and uniting objects made of weldable thermoplastic polymers. In particular, the invention is concerned with weldingly connecting two or more self-supporting structures, such as tubes, pipes, sleeves, fittings and the like articles made of weldable thermoplastics in an area of mutual overlap by heating a limited area so as to produce mutual fusion and coalescence in the welding area and allowing the weld to cool and solidify for producing an integral connection joining the welded structures.

Such methods are well known in the art and have been defined in various standards, e.g., German Industrial Standards DIN 1930, Sheet No. 3, "Welding of Plastics". Specific methods and applications are disclosed, for example, in Swiss Pat. Nos. 336,980, 349,404 and 396,536, in German Patent DT No. 802,282, the published German Applications DT-AS Nos. 1,071,433, 1,099,157 and 1,704,318.

All prior art methods for welding thermoplastic structures of the type mentioned are intended to produce homogeneous fusion in the welding zone, i.e. where the parts of the objects to be joined are subjected to conditions sufficient to transform the normally solid thermoplastic polymer composition by the impact of heat, and preferably by the additional impact of pressure, into a state capable of coalescence; generally such state is reached when the materials to be welded are at least plastic.

Hereinbelow, the terms "thermoplastic polymer compositions" and "thermoplastics" are used interchangeably to broadly refer to those synthetic structural materials or plastics which can be said to be macromolecular or polymeric (having appropriate molecular weights of, typically, from a few thousand to several millions) and which are obtained by various methods including polymerization by polyaddition, polycondensation and the like methods of converting so-called "mers" (monomers or low molecular polymers) into high molecular products. Specific examples of suitable thermoplastics will be given below but it is to be understood that this term is to include homopolymers, heteropolymers (polymers produced from two, three or more different mers by simultaneous or subsequent reaction) as such or in mixtures with each other or with conventional additives, adjuvants, fillers, etc., the essential common denominator of thermoplastics being their capability of reversible thermal conversion into an at least plastic state by heating the normally solid thermoplastics. The term "at least plastic" is to be understood here as referring to any flowable state of thermoplastic polymer compositions (with or without additions) which under the conditions of the welding method used results in a sufficient interaction of the plastified bonding zone for mutual "welding" together, i.e. thermal fusion, of the welded parts, and which may range from thickly viscous to liquid, depending upon the thermoplastics involved (molecular weight, melt index, linearity, effect of additions). For example, welding by thermal fusion may be achieved with given thermoplastics even before actual fluidity is reached, e.g. by pressing engagement of thermoplastics in a heat-softened or plastic state.

The temperature, which for a given thermoplastics mass under the operating conditions including the pressure, mechanical action and the like, leads to formation of a permanent and integral bond, is designated hereinafter as "welding temperature".

The need for applying a pressure at the welding location in thermoplastics welding is an accepted concept in many standards (e.g. DIN 1930). The magnitude of the pressure actually used in thermoplastics welding does vary widely however, as do the conceptual models of the behaviour of the macromolecule chains of thermoplastics in the region of the welding zone, i.e. the bonding zone in an at least plastic state.

The conventional concept of a mutual interflow upon welding with concomitant interlocking or tangling of the polymer molecules in the bond region of welded parts of thermoplastics has recently been challenged by the hypothesis of a predominantly adhesive bond of "subparticles", i.e. molecular aggregations. On account of the wide differences between the various compositions summarized under the term thermoplastics, in regard to composition and molecular structure, it is questionable whether a single theory of thermoplastics welding is possible for all thermoplastics known to be capable of welding. However, all serious prior investigations of the relation between strength and structure of weld connections indicated that the general aim was to achieve weld zones which are as homogeneous and notch-free as possible. This implies several limitations as to operating conditions and the geometry in the welding area, i.e. the requirement of avoiding gaps at the interfaces.

SUMMARY OF THE INVENTION

It is a primary object of the present invention to provide an improved method of welding thermoplastics that provides for a more effective interaction between the surfaces of thermoplastics objects upon welding.

Another object of the invention is a method of weldingly connecting self-supporting thermoplastics objects by fusion and coalescence of such objects in a mutually overlapping area by producing controlled expansion in the welding zone so as to bridge gaps or other macroscopic voids that are due to a lack of fit at the welded interfaces.

A further object of the invention is the provision of a simple additive in a thermoplastics welding zone which additive is activated upon welding to produce a gas pressure that acts upon the welding zone so as to avoid the necessity of applying substantial external welding pressure.

Another object of the invention is the provision of improved structures obtained by welding thermoplastics.

Yet a further object of the invention is a novel advantageous method of weldingly joining tubes, pipes, sleeves and fittings of the type used for constructing conduits for fluids.

Still another object of the invention is a novel welding element for thermoplastics welding capable of being inserted between the thermoplastics objects to be joined.

Further objects will become apparent as the specification proceeds.

Surprisingly it has been found according to the invention that a technically and economically advantageous new thermoplastics welding, improved in many aspects, can be attained if the theory deduced from the investigations into metal and plastics welding, of the necessity of welding zones to be as homogeneous as possible, is discarded and according to the invention an expanding agent is provided in the heated welding zone, that is the at least plastic zone, which at the temperature in this zone produces a gas pressure acting in it.

This offers two quite substantial advantages, namely both the generation of localized "autogenous" pressures that appear to intensify the desired interaction in the vicinity of the bonding zone, as well as the possibility of having an expanding or tumescent welding zone capable of bridging over the interstices caused by inaccurate fit. The method according to the invention can be applied with advantage for all thermoplastics welding methods or welded joint procedures, wherein the parts to be joined by thermal action penetrate into one another, as is the case, for instance, in joining tubes or fittings having separate or integral overlapping connecting pieces in the manner of prior art sleeve or socket welding, or wherein the parts to be joined — if necessary with suitable external support — comprise mutually overlapping regions and are to be welded at these regions.

With such an overlapping arrangement of parts of the thermoplastics objects to be welded and typically having wall thicknesses exceeding about 1 mm, e.g., 3–10 mm or more, a contact or welding zone is defined between the mutually overlapping regions. Generally, a predominant portion of the zone will be laterally covered by non-fused and relatively rigid thermoplastics material. This rigid wall can support and withstand the gas pressure (this term comprises the pressure of gaseous media including vapors) produced by the expanding agent without significant deformation and prevent an uncontrolled expansion of the weld, i.e. the mass that is at least plastic. According to this invention, the weld zone preferably is laterally covered to an extent exceeding 50%, especially exceeding 90%, calculated as the surface area of the weld zone.

DETAILED DESCRIPTION OF THE INVENTION

Thermoplastics suitable for the method according to this invention are those well known materials capable of being processed by conventional plastics welding methods. Numerous examples are well known in the thermoplastics art and include homopolymers, heteropolymers (including copolymers, graft polymers, block copolymers) and mixtures of various polymers of the broad class of ethylenically unsaturated aliphatic or/and arylic compounds including vinyl compounds, the broad class of compounds capable of forming weldable thermoplastic polyesters or polyamides and other substances capable of forming linear saturated macromolecules. Specific examples include various kinds of polyolefins, especially polyethylenes (both HD and LD) and polypropylenes, polyamides, polyimides, polyacetals (polyoxymethylene), polystyrene, polyvinyl chloride, polyvinylidene fluoride, linear polyesters and other weldable thermoplastics generally available as commercial products with or without the conventional additions.

Examples of conventional additions include active and inert additives such as pigments, fillers, antioxidizing agents, stabilizers and the like, provided that the weldability is not adversely affected by the addition.

As is well known in the art, thermoplastics of the same or similar type may be joined by welding in the sense this term is used in this specification, i.e. by coalescence or fusion in a plastic or fluid state. Generally, selection of proper pairs of thermoplastics for mutual welding can be established by published data and conventional criteria. In the absence of such data, thermoplastics weldability can be established by simple tests. Equivalence of different thermoplastics for mutual welding may be assumed to exist if the materials in question can form a mixed melt capable of forming a homogeneous mass upon solidification.

The term "expanding agent" is used herein to refer to those well known substances as are also termed "blowing agents". Among the broad classes of such agents, so-called "chemical expanding agents" are preferred which are solid under normal conditions and are known from plastics foam technology. Conventional chemical expanding agents suitable for the practice of the invention tend to decompose when heated to their particular activating temperature (starting temperature) so as to form a gaseous decomposition product, e.g. nitrogen or another inert gas such as carbon dioxide. Typical well known expanding agents of this type preferred for the practice of the invention are thermolabile nitrogen compounds, for example azo compounds such as azodicarbonamide, N-nitroso compounds, sulphonyl hydrazides and the like. Activating temperatures can be modified by additives and such modified agents as well as mixtures of different expanding agents or mixtures with substances which act upon the thermoplastics to produce crosslinking, such as organic peroxide compounds for cross-linking of polyolefins, may also be used here.

The gas produced by the expanding agent upon decomposition preferably is a gas that is relatively inert to the welded thermoplastics, such as nitrogen, carbon dioxide or carbon monoxide.

Starting or activating temperatures of suitable expanding agents of above about 100° C, e.g., between 150° and 300° C, are suitable for most embodiments of the practice of the present invention. The activating temperature of the elected expanding agent and the weld temperature may be so adjusted to one another that the expanding agent will be activated after suitable plasticity or viscosity of the thermoplastics material has been achieved in the bonding zone for a substantially uniform distribution of the resulting gas bubbles in said zone.

According to a preferred embodiment of the invention, the expanding agent will be a component distributed in at least one thermoplastics material participating in the bonding zone; as a consequence, such expanding agents are preferred for that embodiment as may be combined with the thermoplastics, for example by extruding, sintering or the like, without substantial activation and which are not activated until a welding temperature exceeding this processing temperature has been reached.

Alternatively, according to another preferred embodiment, the expanding agent may be applied in known manner, e.g. by spraying, spreading or the like, prior to welding onto at least one surface of the thermoplastics objects or inlays which are adjacent in the forming of the welding zone. Furthermore, the expanding agent may be distributed in a welding additive, such as a paste or liquid on a basis of thermoplastics particles, e.g., polyethylene powder for polyethylene moldings, and volatile pasting agent, e.g., alcohol such as ethanol or a ketone, e.g., isobutyl methyl ketone, and may be introduced in this form into the weld zone.

Optimum selection of the parameters, such as activation temperatures, activity (gas volume formed in relation to quantity of expanding agent), quantity and form of distribution of the expanding agent in the weld zone for a given thermoplastic material may be determined by simple tests. In general, preferred parameters are selected such that a weld zone is produced which after solidification comprises a plurality of minute (microscopic) and virtually closed-cell voids which are small in relation to the thickness of the weld zone.

For example, in the case of polyethylene as the thermoplastic material to be welded and an expanding agent such as azodicarbonamide or a similar urea azo compound, suitable weight proportions are in the range of from 1:100 and 1:2000, expressed as the ratio of the weight of the expanding agent used to the weight of that portion of the welded thermoplastics as will become at least plastic upon welding.

The volumetric proportion of the closed-cell voids produced in the weld by the gas formed by the expanding agent to the total volume of the weld zone, as well as the distribution of these voids therein is not critical provided that weld bonds are obtained which are virtually liquid tight and have a sufficient mechanical strength. It will be readily understood that this can be influenced to a considerable extent by the geometry of the thermoplastics structures to be bonded and the zone of weld-bonding.

When weld-joining polyethylene tubes according to the invention by socket or sleeve welding techniques under the stated conditions, solid weld zones will be obtained that are permeated by a multitude of very small (only microscopically visible) closed-cell voids and that even when tested over prolonged periods of time (at elevated temperatures and pressures as defined in standard test methods) remain impermeable to liquids while also having a sufficient mechanical strength.

Local heating of the type required for the formation of the limited welding zone by thermal fusion, i.e. an at least plastic bonding zone, can be achieved by any method known for this purpose, such as the generally preferred electrical resistance heating in the area of the welding zone, e.g., by an electrical heating circuit provided in a portion of the bonding zone and remaining therein, and inductive or capacitative high frequency heating, e.g., with embedded dispersed metal parts of metal particles. The type of heating employed is not critical, however, and the method of this invention may also be applied when using other heating techniques, e.g. with conventional friction heating.

BRIEF DESCRIPTION OF THE DRAWINGS

While the specification concludes with claims particularly pointing out and distinctly claiming the subject matter which is regarded as forming the present invention, it is believed that the invention will be better understood by reference to specific preferred embodiments as illustrated in the drawings in which

DETAILED DESCRIPTION OF THE DRAWINGS

Figure 1:
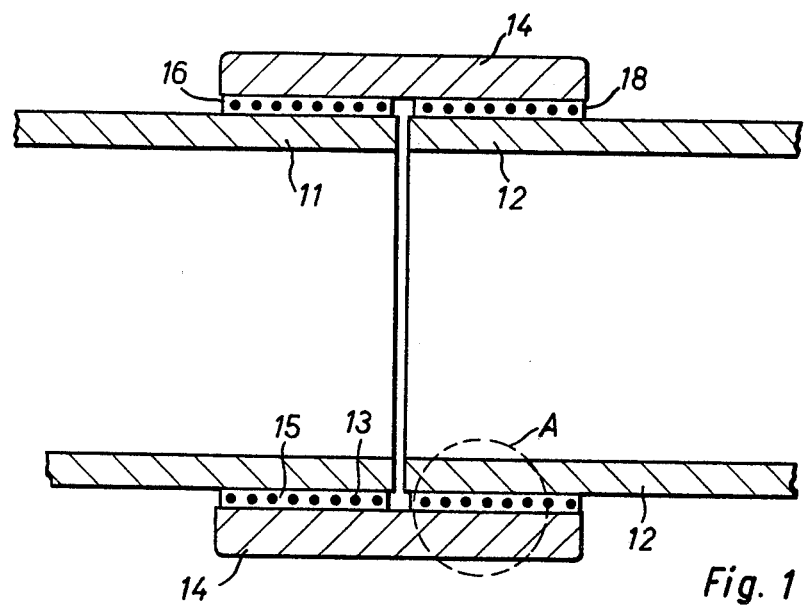
FIG. 1 is a cross-section of the diagrammatic view of a tube sleeve weld for welding according to the method of this invention.

The tubes or tube ends 11, 12 shown in FIG. 1 are surrounded by a sleeve 14. Between the tube ends 11, 12 and the sleeve 14, resistance heating layers 16, 18 are provided which may be part of the sleeve 14 or may be pushed in, as separate collars, inserts or welding rings (FIG. 3) between the tube ends 11, 12 and sleeve 14. The heating wires 13 are surrounded and mutually isolated by thermoplastic material 15. Tubes 11, 12, sleeve 14 and thermoplastic material 15 consist of weldable thermoplastics which are the same or of similar type, such as polyethylene with the usual additives (e.g., pigment, stabilizers and the like). The expanding agent, e.g., azodicarbonamide, may be distributed within the thermoplastic material 15, between this and the adjacent tube or sleeve surfaces, or between heating wire 13 and thermoplastic material 15, for example as a wire coating. Alternatively or additionally, tube ends 11, 12 or sleeve 14 may contain the expanding agent, for example as a coating, an inlay, an overlay or some other form of distribution.

Figure 2:
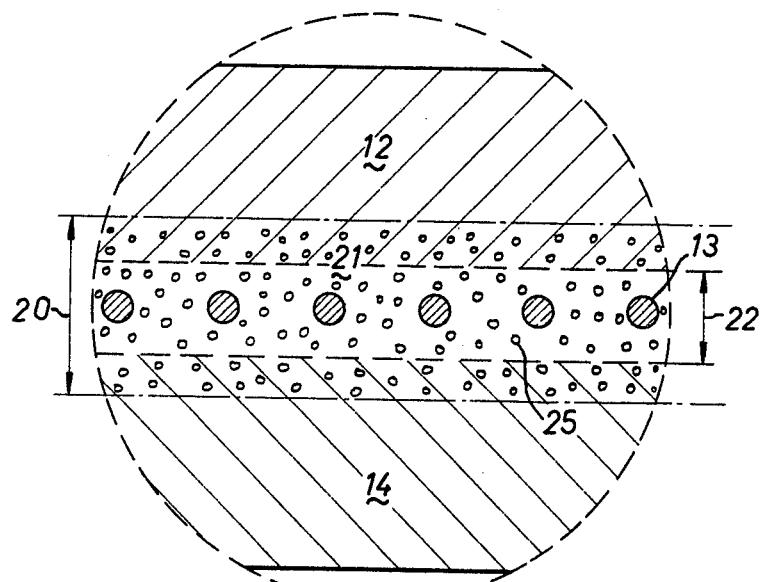
FIG. 2 is an enlarged detail A from FIG. 1 after welding.

For weld-joining tube ends 11, 12 to sleeve 14 heating wires 13 are supplied with electrical current through conductors (not shown) in order to achieve the temperature required for welding and for activating the expanding agent. A welding zone is produced, i.e. the thermoplastics material is rendered plastic at least. After switching off the heating current, said zone commences to cool and soon resolidifies. The resolidified material forms an integral fusion-bond (weld) between the thermoplastics material of tubes 11, 12 and of the sleeve 14. Heating wires 13 remain in the joint. The structure of the weld location is shown semi-diagrammatically in FIG. 2. Double arrow 20 indicates the thickness of the weld zone 21 while double arrow 22 shows the distance between tube and sleeve (at least partially filled by layer 18) before welding. As a result of welding, the interfaces initially present between sleeve 14 and layer 18, on the one hand, and between tube end 12 and layer 18, on the other hand, disappear. It will be understood that there is no defined or sharp interface between weld zone 21 (corresponding to double arrow 20) and that wall material which remains solid during welding of sleeve 14 and tube ends 12, 11. As diagrammatically indicated in FIG. 2, weld zone 21 is permeated by small, closed-cell voids, but these voids may in reality be so small as to require viewing a section under magnification by a microscope. It is to be emphasized that size and distribution of voids 25 shown in FIG. 2 are not intended to illustrate actual sizes and proportions.

By suitably selecting the process parameters, the distribution and size of the closed-cell voids can be controlled as required. Complete activation of the expanding agent can be delayed until the thermoplastics material has reached a degree of plastification or liquefaction by the welding heat so that the expanding agent contained in the plasticized material can form gas bubbles therein and presses the plasticized portion against the colder and still unplasticized material, thus filling up any interstices originally present in the assembly. Since the weld zone remains substantially covered by rigid wall material of the welded structures, the pressure effect generated by the expanding agent remains virtually limited to the weld zone and contributes to a limitation of the size of the closed-cell voids. Some issuing of the plasticized mass of the expanding or tumescent welding zone from the sleeve outlets may be desirable as this permits a visual control of the welding operation.

Weld connections produced by the method of the invention according to FIG. 1 were tested and the results were compared with the test results of analogous weld connections made without the addition of expanding agent. At standard test pressures both groups of weld connections remained liquid-tight for the entire standard test period and even longer. Break resistance tests of welds obtained by the method of the invention showed equivalent or improved results. While not wishing to be bound by any theory, it may be assumed that the expanding agent additive causes stronger interaction at the interfaces of the components participating at the weld location, probably as a result of the pressure produced by the generation of gas from the activated expanding agent. This pressure is received and supported by the adjacent, rigid wall components 12, 14 that substantially cover the sides of the welding zone. The fused mass expanding under the effect of the multiplicity of local gas evolution sites fills any available space including all gaps caused by inaccurate fit and is subjected to melt turbulences not encountered in thermoplastics welding without the use of expanding agent. Both effects mentioned may contribute to the improved weld qualities.

Figure 3:
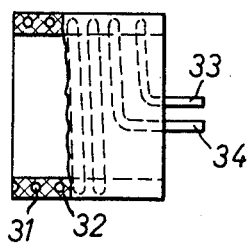
FIG. 3 is a semi-diagrammatical and partially sectional view of a heating inlay suitable as connecting element for the electrical resistance wire sleeve welding according to the method of this invention.
Figure 4:
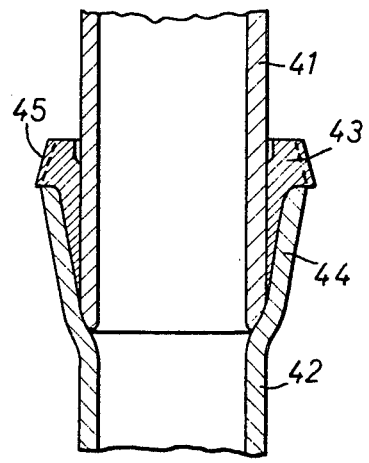
FIG. 4 is a sectional view of two pipe elements to be joined by friction welding according to the method of this invention.

FIG. 3 illustrates a sleeve-type or annular heating inlay suitable as a welding element or insert of the type generally disclosed in Swiss Pat. No. 349,404 and including an electrical conductor 31 of spaced wire turns having an insulation made of thermoplastics material 32. The welding element is provided with terminals 33, 34 for connection with a source of welding current for resistance heating of conductor 31. Elements of this type are suitable as welding inserts according to this invention if the welding location or the sleeve or other type inserts are provided with expanding agent in the manner described above. Prior art mat-shaped welding inserts may be used in this manner for the invention. FIG. 4 illustrates a thermoplastics friction welding method such as disclosed in German Specification DT-AS No. 1,099,157 including two tube ends 41, 42 of thermoplastics, one of which is widened out conically to a socket 44. A wedge-shaped rotatable ring 43 is placed into the conical annular gap of the assembly and the outwardly extending end of ring 43 is provided with a drive connection, e.g., a ring of teeth 45. Ring 43 is made to rotate in frictional engagement with the adjoining surfaces of tube ends 41, 44 so as to generate sufficient heat of friction for the welding operation. The method according to this invention can be applied with this prior art thermoplastics welding procedure, e.g., by providing the expanding agent in the material of ring 43 or the surface portions thereof as are intended for frictional engagement.

Figure 5A:
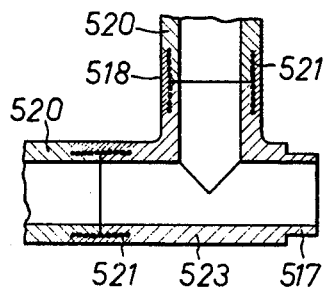
FIGS. 5a, 5b, 5c are diagrammatic sectional views of pipe elements with inlays for electrical resistance heating according to the method of this invention, partially in the welded state and partially in the state prior to welding.
Figure 5B:
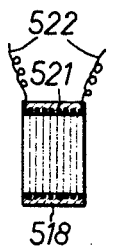
Figure 5C:
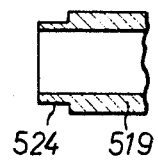

FIGS. 5a, 5b, 5c illustrate an embodiment of the thermoplastics welding technique disclosed in Swiss Pat. No. 336,980 and comprising welding sleeves for electrical resistance heating. Fittings 523 and tubes 519, 520 are made of weldable thermoplastics and provided with recessed portions 517, 524 corresponding to the internal diameter of a cylindrical connecting element 518 made of resistance heating wire and a thermoplastics that is capable of being welded with the other components. The external diameters of fitting 523, element 518 and tubes 519, 520 are equal and the recessed portions 517, 524 are made to fit into element 518.

The piping elements to be weldingly joined by an integral weld-bond are assembled with two connecting elements 518 arranged between tubes 520 and fitting 523 as shown in FIG. 5a. Elements are then resistance-heated by supplying welding current to the connections 522 so as to cause fusion and welding. For using the inventive welding method in connection with this welding technique the expanding agent can be applied in the manner explained above as a component of the material of the connecting elements 518 and/or of the tubes 519, 520 and fittings 523 and/or as coating on mutually overlapping portions of the structures joined in the assembly prior to welding.

Figure 6:
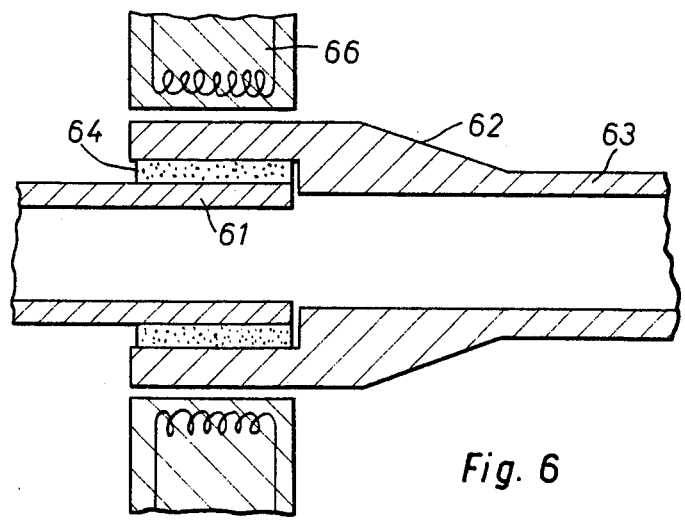
FIG. 6 is a diagrammatic sectional view of an inductive socket weld according to the method of this invention.

FIG. 6 is intended to diagrammatically illustrate the use of high frequency heating for the invention. Tube end 61 is assembled with an insert or sleeve 64 and the socket-type end portions 62 of tube 63. Sleeve 64 contains metal particles as indicated in the diagram and expanding agent embedded in a thermoplastics material that is capable of being welded with the thermoplastics material constituting the tubes 61, 63. A high frequency generator 66 surrounds the weld location and generates the welding heat by primarily heating the embedded metal of sleeve 64. When reaching the welding temperature, the expanding agent will be activated and form a weld zone as described above. Again, the expanding agent can be provided in some or all of the thermoplastics structures and/or at their interfaces. It is to be noted that inductive and capacitative high frequency heating methods can be used.

Preferred embodiments of the invention will now be illustrated by means of specific examples in which percents are by weight. The examples are not intended to limit the scope of the invention.

EXAMPLE I

In this example, the inventive method is used with the sleeve welding technique illustrated in FIG. 1 of the drawings. Sleeve 14 in the shape of a hollow cylinder having a wall thickness of 6 mm, an overall length of 65 mm, a nominal inner diameter of 50 mm and an actual inner diameter of 52–53 mm is made of a commercial polyethylene composition including 2.5% of carbon black as a pigment. The pigmented polyethylene has a density of 0.950 (determined according to ISO 1872-1972), a melt index of 0.20 g/10 minutes (determined according to ASTM D 1238-73 with a sample weight of 2.16 kg) and a molecular weight in the order of 200,000. End portions 11, 12 of two tubes (outer diameter 50 mm, wall thickness 4.6 mm) made of the same polyethylene composition as sleeve 14 are positioned in sleeve 14 as shown in FIG. 1 together with annular welding inserts 16, 18. The structure of the welding inserts is as shown in FIG. 3 of the drawings. These sleeves are produced as follows: conventional heating wire ("nickel silver"; a commercial alloy of copper, nickel and tin) having a diameter of 0.51 mm is coated by means of a single-screw extruder of the type used for production of insulated electric wire. The outlet end of the extruder is provided with a pair of extrusion dies each having a square (3 × 1 mm) cross-section. One pair of wires each is led through each die opening and the distance between the two wires of each pair is 1.5 mm, as measured between the wire centers. The extruder is fed with a mixture of pellets of the polyethylene composition used for the sleeve in mixture with 0.2%, based upon the total weight of the extruded plastics mixture, of pulverulent azodicarbon amide. The extruder temperature is controlled so that the highest temperature of the extruded material is not exceeding 190° C. Also, the mixture of polyethylene and expanding agent is extruded with a minimum residence time in the extruder. Each of the coated wires thus obtained includes two wire filaments and has a cross-section substantially in accordance with the extrusion dies. The coated wire produced is wound on a mandrel to form a welding insert of the structure shown in FIG. 3 with an overall length of 23 mm, an inner diameter of 50.5 mm and an outer diameter of 52.5 mm.

The assembled structure consisting of sleeve 14, two tube ends 11, 12 and welding inserts 16, 18 is weldingly connected by applying a welding current of 7 Amperes and 16 Volts applied during a period of 100 seconds, and then allowing the weld to cool. The maximum wire temperature reached is in the order of 300° C while the temperature of the thermoplast composition adjacent to the wire is about 220° C.

The sleeve-weld joint obtained was tested according to standard procedures by subjecting the structure submersed in hot water (80° C) to an internal pressure of 6 bar. Under such test conditions no breakage was observed during the required test period of 170 hours.

EXAMPLE II

The procedure was as described in example I with the exception that the tubes 11, 12 were made of a different commercial polyethylene composition including 2.0% of carbon black and having a density (ISO standard as above) of 0.956 (measured together with the carbon black), an ASTM melt index (sample weight of 5 kg) of 0.2 g/10 minutes and a molecular weight in the order of 200,000. The results obtained were similar to those of example I.

EXAMPLE III

The procedure was as set forth in example I with the exception that the wall thickness of tubes 11, 12 was 2.9 mm. While tubes with such low wall thickness cannot be welded by normal fusion welding, i.e. without expanding agent, operation according to the invention yielded a perfect weld joint which upon testing in the manner described in example I gave test values well above the required minimum.

Examination of the weld seam obtained according to the examples revealed the structure set forth above including a multiplicity of minute voids distributed in the weld zone and having a closed-cell structure. Spaces or macroscopic voids originally present, i.e. prior to welding, such as gaps caused by insufficient fit (e.g., a 0.1 mm tolerance with a bridging distance of 1.2 mm) were completely filled. Dimension and distribution of the microscopic closed-cell voids produced by the expanding agent showed sone dependence upon the gap size.

It is to be understood that the above described embodiments merely serve to illustrate the invention and that the inventive method can be used in connection with other welding methods suitable for joining thermoplastic structures including a localized weld zone with controlled activation of expanding agent according to the invention within said weld zone. It is surprising that the simple expedient of using an expanding or blowing agent and the intentional production of a nonhomogenous weld zone does provide substantial simplifications and savings in the art of welding of self-supporting structures of thermoplastic compositions. In addition, the invention provides for improved interaction at the interfaces of thermoplastics structures subject to thermal fusion welding. Such interaction may be due both to generation of pressure and to controlled expansion of plastified or liquid material in the welding area.

Thus, it is apparent that the invention fully satisfies the objects, aims and advantages set forth above. While the invention has been described in conjunction with specific embodiments thereof, it is evident that many alternatives, modifications and variations will be apparent to those skilled in the art in the light of the foregoing description. Accordingly, it is intended to embrace all such alternatives, modifications and variations that fall within the spirit and broad scope of the appended claims.

What is claimed is:

1. A method of welding mutually overlapping portions of self-supporting objects made of weldable thermoplastic material, said self-supporting objects being capable of withstanding or supporting gas pressure produced in a welding zone without a significant deformation thereof, said welding being effected substantially without an external pressure which acts vertically to the welding zone, by heating to form a welding zone containing said thermoplastic material in an at least plastic state in an area between said mutually overlapping portions, said method comprising the step of providing an expanding agent in said welding zone, said agent producing at the temperature of said welding zone a gas pressure effective in said welding zone.

2. The method of claim 1 wherein said expanding agent is a normally solid chemical substance capable of producing a gaseous decomposition product when heated to the temperature of said welding zone.

3. The method of claim 1 wherein said expanding agent is included in a thermoplastics material that is present in said welding zone.

4. The method of claim 1 wherein said heating is effected by an electrical conductor for resistance heating of said welding zone.

5. The method of claim 4 wherein said electrical conductor is a heating coil provided in said welding zone.

6. The method of claim 5 wherein said expanding agent is provided in a layer adjacent to said heating coil.

7. The method of claim 1 wherein said heating is effected by inductive high frequency heating.

8. The method of claim 2 wherein said expanding agent is provided in said welding zone as a mixture comprising said agent and a thermoplastics material, said mixture being applied onto a surface of one of said objects in said area between said mutually overlapping portions.

9. The method of claim 1 wherein said heating is effected by friction and said expanding agent is present in the friction zone.

10. A method of weldingly connecting interpenetrating self-supporting elements made of a weldable thermoplastic material, said elements being capable of withstanding or supporting gas pressure produced in a welding zone without significant deformation thereof, by assembling said elements so as to form at least one area of mutual overlap of said elements substantially without an external pressure which acts vertically to said area, heating said thermoplastic material to an elevated temperature for fusion and coalescence in said area of overlap and in the presence of an expanding agent capable of forming a gas at said elevated temperature for promoting said coalescence; and allowing said coalescence to solidify at a temperature below said elevated temperature.

11. The method of claim 10 wherein said elements include an insert comprising a thermoplastics material and a metallic conductor for electrically heating said insert.

12. The method of claim 11 wherein said expanding agent is provided in said thermoplastics material of said insert.

13. The method of claim 12 wherein said metallic conductor is arranged in said area of overlap to be encompassed by said coalescence.

14. The method of claim 10 wherein said heating is effected by frictional engagement of at least two of said piping elements.

15. A self-supporting welding element for welding structures made of a thermoplastic material substantially without an external pressure which acts vertically to the welding zone, said element comprising a thermoplastic portion capable of being weldingly connected with said structures, a metallic conductor for electrical heating embedded in said thermoplastic portion, and an expanding agent capable of forming a gas upon heating to a temperature where said thermoplastic material of said structures and said thermoplastic portion are in at least plastic state.

16. The welding element of claim 10 in the form of a welding insert having a generally circular cross-section.

17. The welding element of claim 10 in the form of a mat.

18. The welding element of claim 16 in the form of a welding sleeve.

19. The welding element of claim 15 in the form of a friction ring suitable for friction welding and having a wedge-shaped profile for welding to a friction welding socket.

* * * * *